March 26, 1963
A. T. EDWARDS ET AL
3,083,258
CONDUCTOR SPACER-DAMPER
Filed June 9, 1961
4 Sheets-Sheet 1
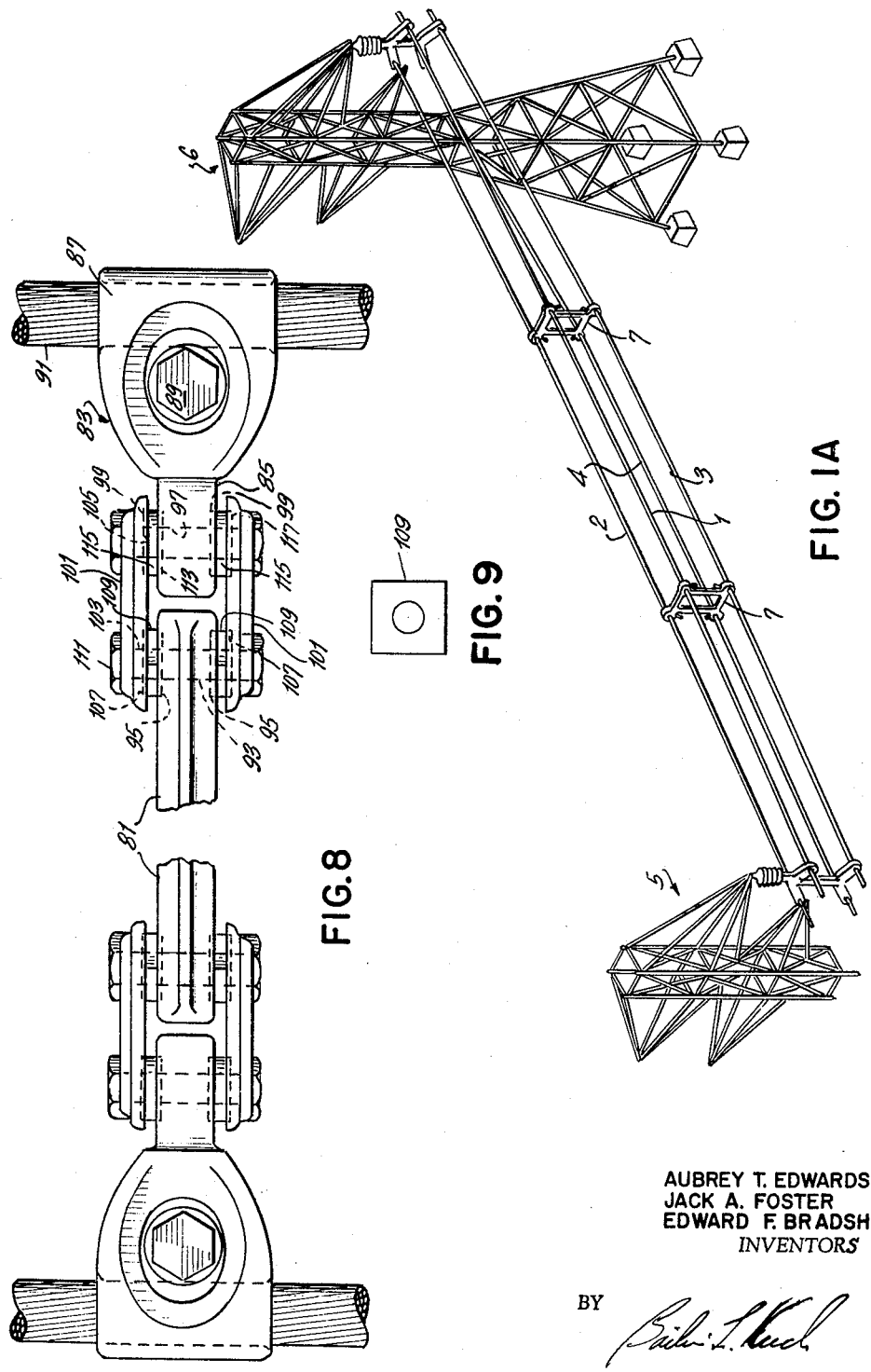
AUBREY T. EDWARDS
JACK A. FOSTER
EDWARD F. BRADSHAW
INVENTORS
BY
ATTORNEY March 26, 1963

A. T. EDWARDS ET AL 3,083,258

CONDUCTOR SPACER-DAMPER

Filed June 9, 1961

AUBREY T. EDWARDS
JACK A. FOSTER
EDWARD F. BRADSHAW
INVENTORS

BY

ATTORNEY

March 26, 1963 A. T. EDWARDS ET AL 3,083,258
CONDUCTOR SPACER-DAMPER

Filed June 9, 1961 4 Sheets-Sheet 3

AUBREY T. EDWARDS
JACK A. FOSTER
EDWARD F. BRADSHAW
INVENTORS

BY

ATTORNEY

March 26, 1963 A. T. EDWARDS ET AL 3,083,258
CONDUCTOR SPACER-DAMPER
Filed June 9, 1961 4 Sheets-Sheet 4
FIG. 6A
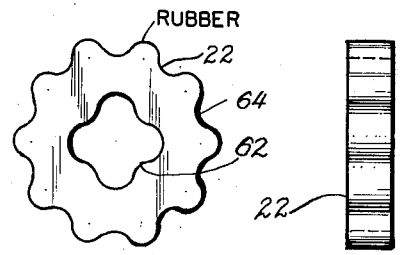
FIG. 6B
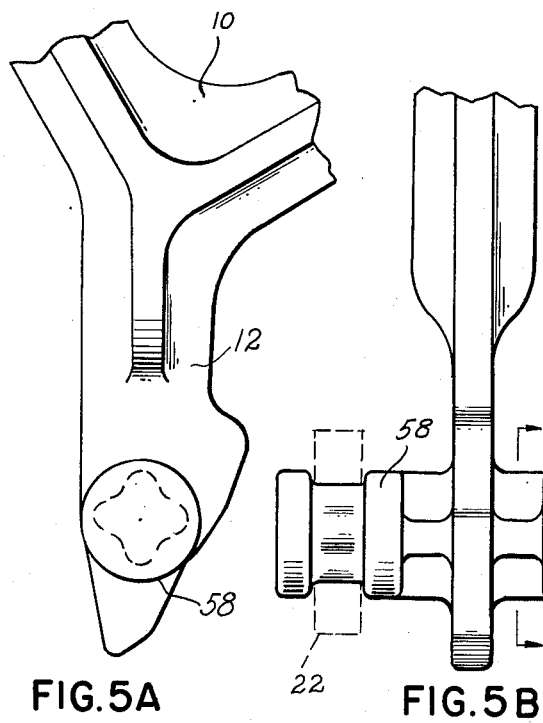
FIG. 5A
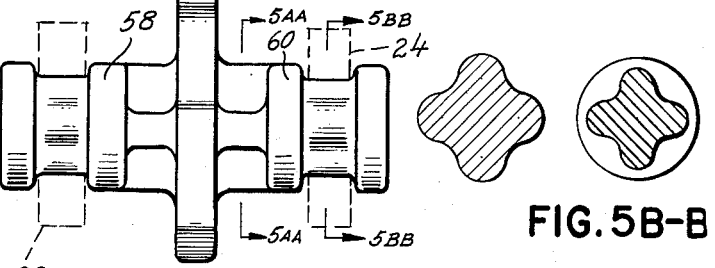
FIG. 5B
FIG. 5A-A
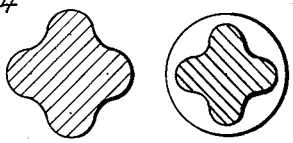
FIG. 5B-B
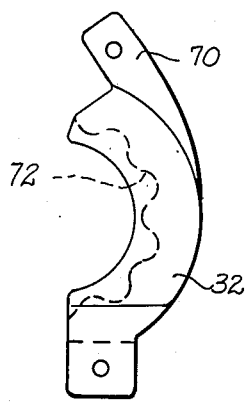
FIG. 7A
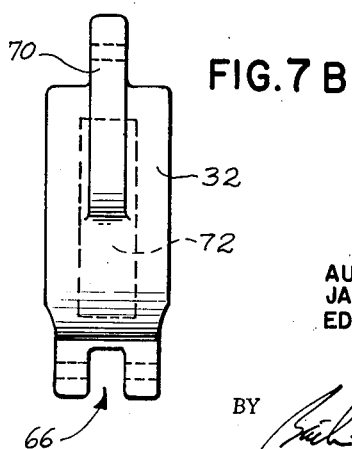
FIG. 7B
AUBREY T. EDWARDS
JACK A. FOSTER
EDWARD F. BRADSHAW
INVENTORS
BY
ATTORNEY 3,083,258
CONDUCTOR SPACER-DAMPER
Aubrey Thomas Edwards, Oakville, Ontario, Jack A. Foster, Oshawa, Ontario, and Edward F. Bradshaw, Agincourt, Ontario, Canada; said Foster and said Bradshaw assignors to Burndy Corporation, a corporation of New York
Filed June 9, 1961, Ser. No. 116,185
7 Claims. (Cl. 174—42)

This invention relates to spacers for bundled line conductors, and particularly to the reduction of wind excited vibrations in such conductors by the incorporation of energy absorbing elements in the spacer.

Electrical power transmission in the past has commonly involved three phase, high voltage lines operated in the range of 110 kilovolts to 230 kilovolts. In such installations it has been customary to utilize single, multi-strand, conductors for each phase of the line. When transmitting electric power by such single conductors, however, there is a practical upper limit to the voltages that may be transmitted due to the problems of skin and corona effect. The energy may also be limited by the combined effects of the conductance and capacitance of the conductor system.

Installations are currently being made transmitting 460 kilovolts or higher by means of bundled conductors comprising a plurality of spaced apart conductors for each phase. The conductors per bundle customarily number two, three or four. These conductors are held in a uniformly spaced apart relationship by means of a bundle spacer or frame which is clamped to each conductor in the bundle.

These bundled conductor installations suffer from many of the same mechanical problems as single conductor installations do, particularly from vibration. Cross-winds of low velocity tend to induce vibrations or oscillations in the conductors, mainly in the vertical plane, between the points of attachment of the conductors to their towers. This vibration of the conductors, causing continuous and severe flexure at the points of attachment, often leads to early fatiguing of the conductors at these points. This problem is aggravated by the modern tendency to string the conductors at increasingly higher mechanical tensions.

Various protective schemes have been tried, including making the conductors of noncircular cross-section to avoid the inception of vibrations; and avoiding the use of fixed points of attachment, by the use of resilient attachment means, to reduce the bending stresses in the conductors due to such vibrations. The most commonly used scheme, however, is to attach weights to the conductors, which are either resiliently connected to the single conductors and so will absorb energy therefrom; or are fixedly connected to the single conductor, but have a center of gravity which is not in the same vertical plane as the conductor, and so will tend to twist the conductor and make the conductor itself absorb energy by interstrand friction; or devices using a combination of the above principles.

If this last mentioned scheme of direct connection is utilized, it is necessary that the motion of the conductor at the point of connection induce relative motion in a resilient member in order to affect absorption of the vibration energy. This has in the past been provided by a spring loaded, high friction, pivot between the weight and its cable connecting arm, or by compressing a plain sheet of rubber between the pivoted-together weight and arm. In this last mentioned arrangement, it will be appreciated that the sheet of rubber is subjected to laminar stress in planes parallel to the bearing surfaces of the weight and arm, over the area of the sheet.

We have found that under the commonly encountered operating conditions, conductors vibrate at one or more frequencies within a specific band. The frequencies of vibration will be determined by a number of factors including: the conductor material, diameter, stranding arrangement, cross-sectional shape, heat treatment, weight per unit length, the distance or span between supporting towers or points of attachment; the temperature and tension at which the conductor is initially strung, the operating temperature and the wind speed and direction.

To damp each frequency it is necessary to attach a damping element to the conductor as close as possible to the point of maximum amplitude or antinodal points for the specific frequency. We have found that the various possible frequencies and combinations thereof may be adequately damped by a plurality of damping elements attached over the length of the conductor span.

This novel method may readily be distinguished from the commonly followed custom of attaching one or two damping elements to the conductor adjacent the tower at distances therefrom up to eight feet.

Since the individual conductors are bundled together, mechanical vibrations will not only be induced in the conductors individually, but also in the bundle of conductors as a whole. This necessitates a damping device which concurrently acts on all the conductors of the bundle. We have found that a unitary damping device, comprising a mass, spring, and means for absorbing vibration energy, and incorporated into a spacer for the bundle of conductors possesses the following adantages: eliminates the need for separate vibration protection or dampers and reduces the number of sources of corona and radio interference.

It is necessary that there be some flexibility or articulation in the spacer clamping arrangement, to accommodate for other relative movements between the several conductors of the bundle. One such movement may, inter alia, be caused by uneven ice loading or short circuit currents.

It is also necessary in high voltage installations that all equipment attached to the conductors provide a uniform electrostatic field to avoid corona discharge. This may be affected by the use of corona shields, or by avoiding the use of sharp projections on the exterior surfaces of the equipment. The use of a centrally located damping device simplifies the latter solution.

It is, therefore, an object of this invention to provide a spacer-damper which in addition to its primary function of maintaining the designed spacing between conductors, provides means of absorbing mechanical vibration energy, of the individual conductors, and the bundle as a whole, and further, serves to limit to a safe level the strain in the conductors rising from relative longitudinal motion and other motions between the conductors. The spacer eliminates the need for the separate vibration dampers referred to previously.

It is another object of this invention to provide a bundled conductor spacer which serves concurrently as a corona shielded spacer, and as a directly connected, vibration damper which permits adequate longitudinal and other movement of each of the conductors in the bundle relative to the other conductors.

It is still another object to provide a vibration damper which includes a resilient coupling between the weight and the arm wherein the stresses are limited to a safe level throughout the coupling.

It is a further object to provide a spacer-damper combination wherein the bundle spacer and the ends of its conductor clamps are interconnected by means of a cylinder of resilient material, the clamp being secured to one wall of the cylinder, and the spacer secured to the other wall of the cylinder.

Yet another object of this invention is to provide a method of distributing vibration damping devices over the length of a conductor span to maximize the damping effect on the commonly encountered vibrational frequencies.

A feature of this invention is a bundled conductor spacer which also acts as a vibration damper for each of its conductors and is connected to each conductor by means of an elastomeric energy absorbing means, the cylinder being put into stress by relative movement of the body of the spacer and the conductor perpendicular to the conductor axis, and parallel to the conductor axis.

These and other objects and features of this invention will become more apparent by reference to the following description taken in conjunction with the accompanying drawings, in which:

FIG. 1A is a perspective view of a bundled conductor transmission line installed between two supporting towers;

FIG. 5A is a front view of a portion of the spacer arm of FIG. 3;

FIG. 5B is an auxiliary side view of the spacer arm of FIG. 5A taken parallel to the axis of the arm;

Figure 3:
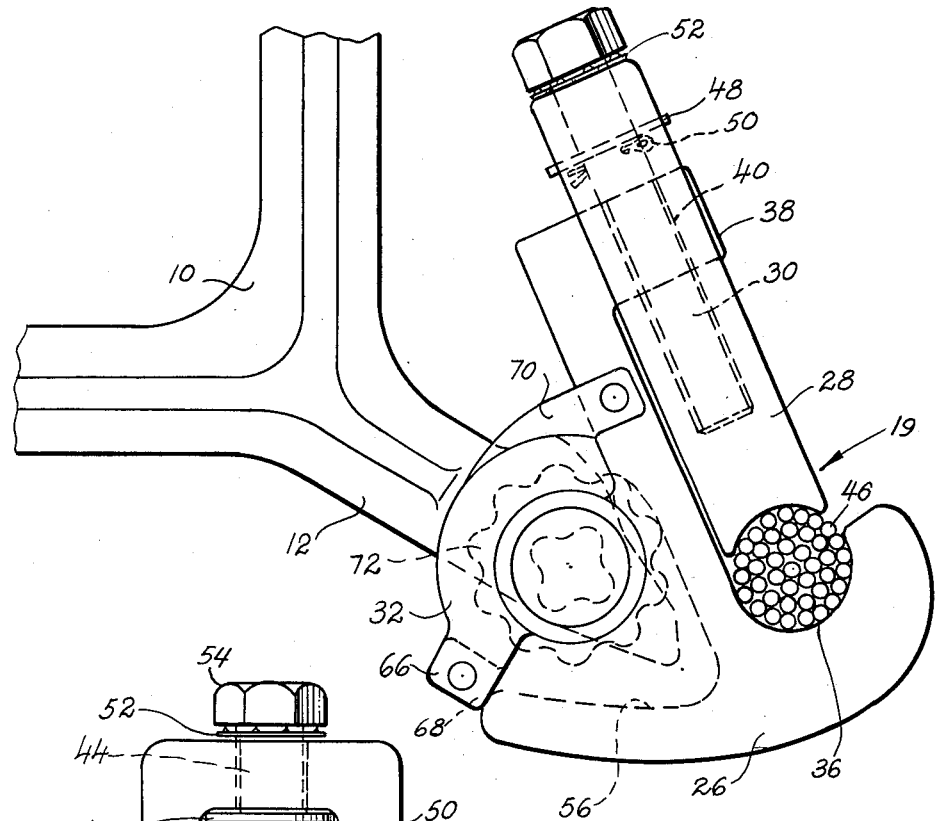
FIG. 3 is a detail front view of a portion of the spacer of FIG. 2 showing a conductor clamp connected to the arm of the spacer.
Figure 4:
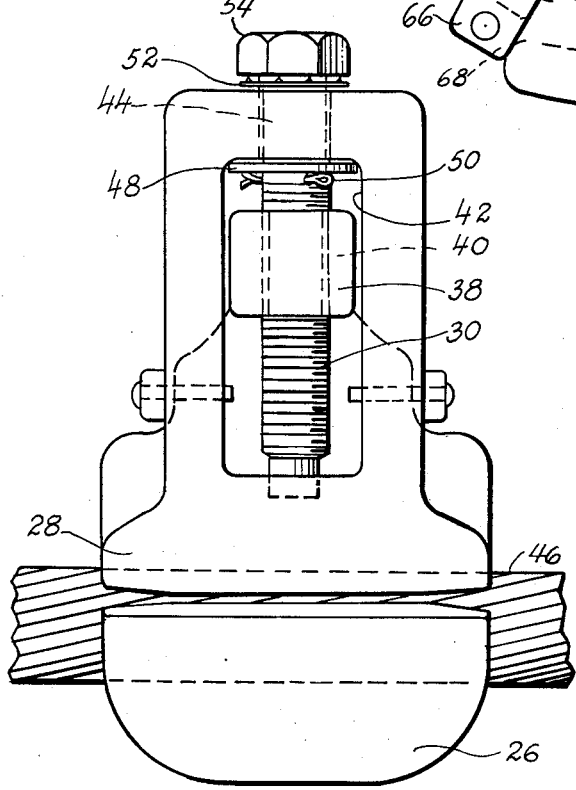
FIG. 4 is an auxiliary side view of the clamp of FIG. 3 taken parallel to the axis of the clamp pressure screw.

FIG. 5AA is a cross-sectional view taken along line 5AA of FIG. 5B;

FIG. 5BB is a cross-sectional view taken along line 5BB of FIG. 5B;

FIG. 6A is a front view of one of the pair of resilient cylinders providing the resilient connection between the spacer and clamp of FIG. 3;

FIG. 6B is a side view of the resilient cylinder of FIG. 6A;

FIG. 7A is a front view of one of the pair of clamp caps of FIG. 3;

FIG. 7B is a side view of the clamp cap of FIG. 7A;

FIG. 8 is a top view of a second embodiment of this invention; and

FIG. 9 is a front view of one type of washer for use in the embodiment shown in FIG. 8.

Figure 2:
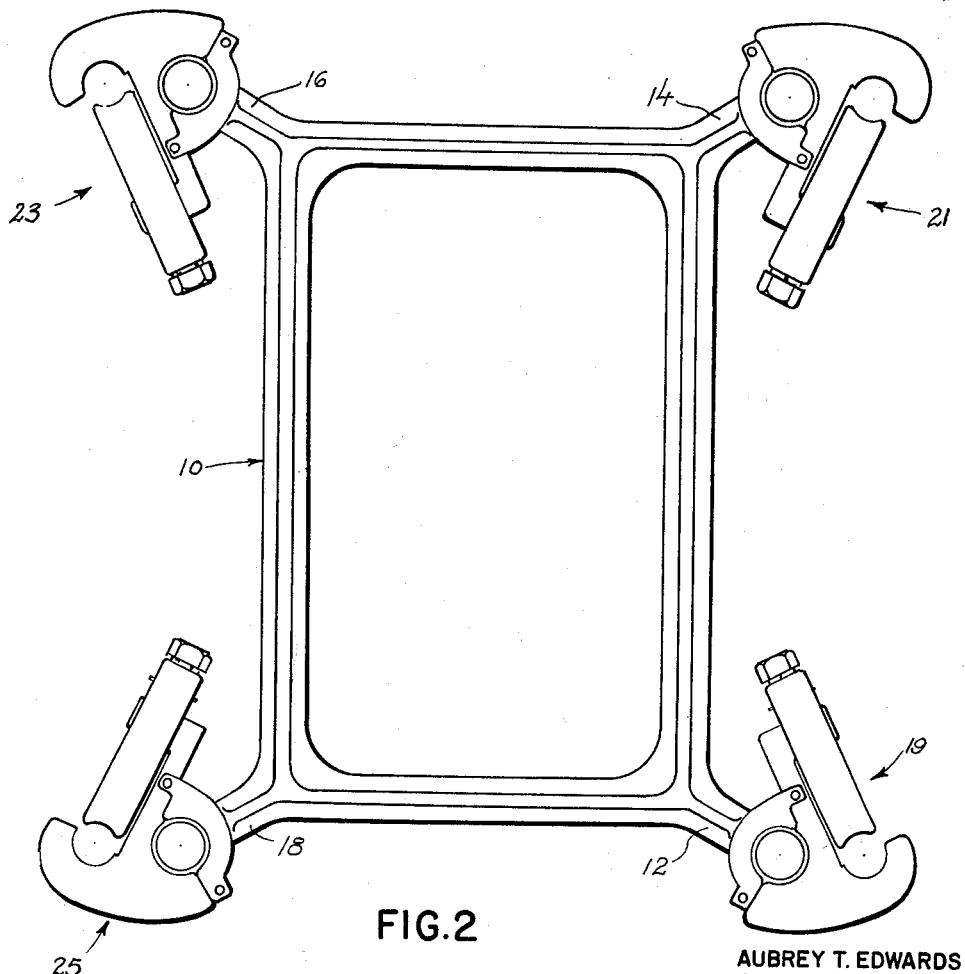
FIG. 2 is a front view of a spacer for a four wire, bundled conductor embodying this invention.

It will be appreciated that although the specific embodiment shown in FIG. 2 is a four conductor bundle spacer, the same inventive features can be as well applied to a two, three, five, etc. bundle conductor spacer-damper combination.

Referring to the drawings, FIG. 1A shows a portion of a transmission line consisting of four bundled conductors 1, 2, 3 and 4 supported between two towers 5 and 6. The four conductors are spaced apart by means of a plurality of spacers 7 which also serve to damp vibration of the conductors as will be described below. The wave lengths of the conductor vibrations might range from six to forty-eight feet, for example.

As an exemplary approximation, we have found that in a 477,000 circular mill conductor strung at an unloaded tension of 25% of ultimate tensile strength between towers separated by 1400 feet, under a wind velocity range of one to ten miles per hour, the following vibration frequencies may be individually or concurrently present: five to forty cycles per second.

Figure 1B:
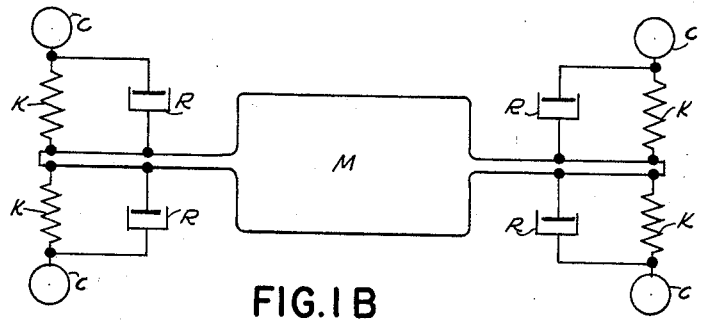
FIG. 1B is a schematic presentation of the physical constants of a combined spacer-damper.

FIG. 1B shows schematically the essential elements of the spacer 7. A mass M is supported by the conductors C via four springs K. At moderately low wind velocities the conductors will vibrate in the vertical direction. By proper selection of the mass M and the stiffness of the springs K, considering also the effects of the conductor stiffness and the mass of the conductor clamps, relative motion may be provided between the mass M and the conductors C. If appropriate damping R (i.e. a capacity for absorbing or dissipating energy) is incorporated between each conductor C and the mass M, the spacer will absorb vibrational energy due to the relative motion between the conductors C and the mass M. By proper location of the spacers in a bundled conductor span, the vibration of the conductors can be reduced or dissipated to a level below the conductor fatigue limit and will thus eliminate the need for separate vibration dampers. This will also improve the design of extra high voltage lines by reducing the number of potential sources of corona and radio interference.

A preferred embodiment is shown in FIG. 2, wherein it will be seen that the spacer-damper consists of a spacer body 10 of frame construction having four arms, 12, 14, 16, 18 to each of which is mounted a conductor clamp 19, 21, 23, 25. Each clamp is mechanically pivoted to its frame arm by means of a pair of resilient cylinders which may be of rubber and which serve as energy absorbers.

Referring to the drawing, each clamp consists of a fixed base jaw 26, a movable jaw 28, a pressure screw 30, the two rubber cylinders 22, 24, and a pair of clamp caps 32 (of which only one is shown). As illustrated the cylinders have a washer-like configuration which due to their central passageway may be termed a tube. The clamp base jaw 26 has a conductor receiving groove 36, and an upstanding post 38 with a threaded pressure screw hole 40 therethrough. The movable jaw 28 has a rectangular slot 42 which receives the post 38, and a rear pressure screw hole 44. The pressure screw 30 is passed through the jaw hole 40 and threaded through the post hole 44. Rotation of the pressure screw 30 advances the movable jaw 28 against the fixed jaw conductor receiving groove 36 and clamps a conductor 46 therein. A washer 48 and a cotter pin 50 may be provided to capture the pressure screw 30 to the movable jaw 28; and a lockwasher 52 may be provided under the head 54 of the pressure screw 30.

The rear of the fixed jaw is hollowed out at 56 to receive and clear the end of the frame arm 12. Upstanding from each of the two sides of the arms is a splined post 58, 60. Each post has mounted thereon one of the pair of elastomeric torsion vibration dampers 22, 24, or elastomeric springs or energy dissipation devices, which are here shown as rubber cylinders, the inner and outer walls 62, 64 of which have keyways. The inner cylinder keyways interlock with the post splines, while the outer keyways interlock with a plurality of splines formed on the fixed jaw and clamp cap. It will be appreciated that instead of the illustrated spline and keyway arrangement, the cylinders may be keyed by vulcanizing or by bonding with adhesives, or the like to the posts and the other parts.

Each clamp cap has a slotted projection 66 to receive a fixed jaw projection 68, and has another projection 70, both of which are pinned to the fixed jaw 26. The interior of each cap is hollowed out at 72 and has a plurality of internal splines to interlock with the outer keyways 64 of the cylinder 22.

It will thus be seen that the conductor clamp 19 is resiliently pinned to the frame arm 12 by means of the two rubber cylinders 22, 24 and two arm posts 58 and 60 and the two clamp caps 32. It will be appreciated that the relationship of the parts may be reversed, and that the posts may be formed on the clamp, while a yoke is formed on the arm.

Since the center of gravity of the entire assembly passes through the center of the frame, it will be seen that vibartional movement of each conductor is opposed by the mass of the frame and the other three conductors, with a resultant energy absorption occurring within the elastomeric cylinder in the spacer-damper. A minor amount of energy is also absorbed due to interstrand friction within the conductor and to other reflection effects.

It is thus apparent that since the shear modulus of rubber is one-tenth that of rubber in compression or tension that the energy absorption or dissipation device shown in the drawings has the ability to absorb or dissipate ten times the energy of the line moving vertically than it does for the line moving longitudinally or horizontally.

It will be appreciated that by proper selection of the resiliency and dimensions of cylinders, and the relative masses of the frame and clamps, spacers can be designed to absorb practically all of the vibration energy of the conductors.

In order to prevent high over-stressing and resultant rupturing of the resilient cylinders if the clamp pivots too far with respect to the arm in either direction, the end of the arm is arranged to directly engage the surface of the clamp and lock the clamp against further pivoting with respect to the arm.

The cylinders also permit some tilt of the clamp with respect to the frame dependent upon the clearance between the frame arm and the fixed jaw of the clamp, the spacing between the pair of cylinders and the resiliency and thickness of the cylinders. This tilt permits the frame to accommodate relative axial movement between the conductors.

As a given conductor will tend to vibrate at a number of frequencies within a band depending on the characteristics of the conductor, it is desirable that the spacer-damper be tuned to the center frequency of this band. This tuning may be accomplished by proper selection of the weight of the suspended portion and of the conductor clamps.

It will be appreciated that to avoid corona effects at high voltages the outer periphery of the spacer and clamps assembly must be smooth and offer no sharp projections which will form stress concentrations in the electrostatic field surrounding the assembly. For maximum corona reduction it is necessary that the clamps be electrically connected to the frame. This may be accomplished by making the resilient cylinders of an electrically conductive material. For this reason the outermost portions of the fixed jaws and caps are kept smooth and rounded, and all projecting elements, such as the pressure screws, are kept within the assembly periphery formed by the fixed jaws and caps.

A second embodiment of this invention is shown in FIG. 8, as a spaced-damper for a two conductor bundle. A central spacer arm 81 is pivoted to a pair of identical conductor clamps 83. Each clamp 83 includes a fixed jaw having a rear projecting arm 85 and a movable jaw 87 secured thereto by means of a bolt 89. A conductor 91 may thus be secured to the clamps 83. A hole 93 is provided in each end of the spacer arm 81 and a square counterbore 95 is provided into both of the surfaces of each arm coaxial with the holes 93. A hole 97 is provided in each clamp arm 85 and a circular counterbore 99 is provided into both of the surfaces of the arm coaxial with the hole 97. A pair of side plates 101 having holes 103 and 105 link the clamp arm 85 to the spacer arm 81. A rectangular counterbore 107 is provided into the inner face of each side plate 101 coaxial with holes 103. The counterbores 107 are identical in size and radial orientation to counterbores 95. A washer 109 having a square outer surface and a circular inner surface is disposed between the arms 81 and each side plate 101, and disposed in part in square counterbore 95 and in part in square counterbore 107. A bolt 111 is secured through the two side plates 101, the two square washers 109 and the spacer arm 81 to make the assembly rigid. A circular counterbore 113 is provided into the inner face of each side plate 101 coaxial with holes 105. The counterbores 113 are identical in size with counterbores 99. A round washer 115 of elastomeric material, e.g. rubber, is disposed between the clamp arm 85 and each side plate 101, and disposed in part in the round counterbore 99 and in part in the round counterbore 113. A bolt 117 is served through the two side plates 101, the two elastomeric washers 115 and the clamp arm 85 to resiliently hold the assembly together.

It will thus be seen that, dependent on the clamping pressure provided by the bolt 117 and the resiliency of the elastomeric washers 115, the conductor clamp 83 is free to pivot about bolt 117 with respect to the spacer arm 81.

Considering individually the lefthand conductor, it will be appreciated that the spacer arm and the righthand conductor will act as a resiliently-pivoted-thereto mass for damping vibrations, while for the righthand conductor individually, the spacer arm and the lefthand conductor will serve as the damping mass. Considering both the right and the lefthand conductors as vibrating concurrently, it will be seen that the spacer arm serves as the damping mass.

Further, since the side plates 101 are spaced away from the clamp arm 85 by the elastomeric washers 115, the clamp will not only be free to pivot vertically about bolt 117 to damp vibrations in the vertical plane but will also be free to tilt somewhat in the horizontal plane to allow for relative longitudinal movement of the conductors.

The invention has thus been described but it is desired to be understood that it is not confined to the particular forms or usages shown and described. The same being merely illustrative, and that the invention may be carried out in other ways without departing from the spirit of the invention, and therefore, the right is broadly claimed to employ all equivalent instrumentalities coming within the scope of the appendent claims, and by means of which objects of this invention are attained and new results accomplished, as it is obvious that the particular embodiments herein shown and described are only some of the many that can be employed to obtain these objects and accomplish these results.

We claim:

1. A bundled conductor assembly for connection to a plurality of cables each having a longitudinal axis extending generally parallel to the ground comprising a frame having a plurality of arms extending therefrom; a conductor clamp connected to said cable and disposed on each said arm; each said clamp being disposed on its related arm by means of an energy absorption device having the ability to dissipate greater amounts of energy due to movement of said cables in a plane through its longitudinal axis perpendicular to said ground compared to the amount of energy capable of being absorbed when said cable is moving in a plane parallel to said ground; said device being the only element in contact with both said clamp and said arm.

2. A bundled conductor assembly for connection to a plurality of cables each having a longitudinal axis extending generally parallel to the ground comprising a frame having a plurality of arms extending therefrom; a conductor clamp disposed on each said arm; a conductor clamped in each said clamp; the center of gravity of said frame-arm-clamp-conductor-assembly displaced from the vertical planes containing each conductor; each said clamp being disposed on its related arm by means of an energy absorption device having the ability to dissipate greater amounts of energy due to movement of said cables in a plane through its longitudinal axis perpendicular to said ground compared to the amount of energy capable of being absorbed when said cable is moving in a plane parallel to said ground; said device being the only element in contact with both said clamp and said arm.

3. A connector assembly for connection to a plurality of cables each having a longitudinal axis extending generally parallel to the ground comprising a supporting arm, a conductor clamp adjacent said arm; an energy absorbing means of substantially tubular shape, having an inner and an outer wall; said supporting arm secured to one of said walls against relative movement therewith; said conductor clamp secured to the other of said walls against relative movement therewith; said energy absorbing means having the ability to dissipate greater amounts of energy due to movement of said cables in a plane through its longitudinal axis perpendicular to said ground compared to the amount of energy capable of being absorbed when said cable is moving in a plane parallel to said ground said energy absorbing means permitting relative movement between said arm and said clamp.

4. A connector assembly comprising a supporting arm, a conductor clamp adjacent said arm, a conductor receiving groove in said clamp; said groove being perpendicular to said arm, an elastomeric torsion energy absorbing means of substantially tubular shape, said energy absorbing means having a central axis parallel to said groove, and an inner and outer wall; said arm secured to one of said walls against relative movement therewith; said clamp secured to the other of said walls against relative movement therewith; said energy absorbing means permitting relative movement between said arm and said clamp about the said tube central axis.

5. A connector assembly comprising a supporting arm; a conductor clamp adjacent said arm; a conductor receiving groove in said clamp; said groove being perpendicular to said arm; an elastomeric torsion energy absorbing means of substantially tubular shape; said energy absorbing means having a central axis parallel to said groove, an inner and an outer wall, and a plurality of splines formed in said inner and outer walls parallel to said central axis; said arm having a plurality of keyways receiving the splines of one of said walls; said clamp having a plurality of keyways receiving the splines of said other wall; and said energy absorbing means permitting relative movement between said arm and said clamp about said tube central axis.

6. A connector assembly comprising a supporting arm; a conductor clamp adjacent said arm; a conductor receiving groove in said clamp; said groove being perpendicular to said arm; an elastomeric torsion energy absorbing means of tubular shape; said energy absorbing means having a central axis parallel to said groove, and an inner and an outer wall; said arm bonded to one of said walls; said clamp bonded to said other wall; and said energy absorbing means permitting relative movement between said arm and said clamp about said central axis.

7. A bundled conductor assembly comprising a frame having a plurality of arms extending therefrom; said frame and arms being substantially coplanar; a conductor clamp adjacent each said arm; a conductor receiving groove in each said clamp; each said groove being perpendicular to the plane of said frame; the center of gravity of said frame-arm-clamp-assembly displaced from the vertical planes containing each said groove; an elastomeric torsion energy absorbing means of substantially tubular shape disposed between each said arm and its adjacent clamp; each said energy absorbing means having a central axis parallel to said adjacent groove, an inner and an outer wall, and a plurality of splines formed in said inner and outer walls parallel to said central axis; each said arm having a plurality of keyways receiving the splines of one of said walls of the adjacent energy absorbing means; each said clamp having a plurality of keyways receiving the splines of said other wall of said adjacent energy absorbing means; and each said energy absorbing means permitting damped relative movement between each said clamp and its adjacent arm about said central axis.

References Cited in the file of this patent
UNITED STATES PATENTS

| | | |
|---|---|---|
| 2,219,893 | Goss | Oct. 29, 1940 |
| 2,271,935 | Buchanan et al. | Feb. 3, 1942 |
| 2,688,047 | MacIntyre | Aug. 31, 1954 |

FOREIGN PATENTS

| | | |
|---|---|---|
| 839,215 | Germany | May 19, 1952 |
| 788,076 | Great Britain | Dec. 23, 1957 |
| 827,743 | Great Britain | Feb. 10, 1960 |
| 1,096,439 | Germany | Jan. 5, 1961 |